United States Patent [19]

Lin

[11] Patent Number: 5,681,116

[45] Date of Patent: Oct. 28, 1997

[54] SLIDING TRACK ASSEMBLY

[76] Inventor: Chin-Chih Lin, 2F, No. 160, Shih Ta Road, Taipei, Taiwan

[21] Appl. No.: 767,877

[22] Filed: Dec. 17, 1996

[51] Int. Cl.$^6$ .............................. A47B 11/00; F16C 29/02
[52] U.S. Cl. ........................ 384/42; 108/140; 108/143; 248/298.1; 248/23
[58] Field of Search ............................ 384/20, 23, 42; 248/298.1; 108/137, 139, 140, 143

[56] References Cited

U.S. PATENT DOCUMENTS

| | | | |
|---|---|---|---|
| 3,649,090 | 3/1972 | Dutot | 384/23 |
| 4,114,945 | 9/1978 | Lutz | 384/42 |
| 4,759,341 | 7/1988 | McFarland | 384/23 X |
| 5,230,289 | 7/1993 | George et al. | 108/140 X |
| 5,588,375 | 12/1996 | Cotterill | 108/143 X |

*Primary Examiner*—Thomas R. Hannon
*Attorney, Agent, or Firm*—Bacon & Thomas

[57] ABSTRACT

A sliding track assembly including a track frame secured to a fixed member and defining two substantially C-shaped sliding grooves longitudinally disposed at two opposite sides and being each other, and a sliding frame fixedly secured to a movable member and having two outward flanges at two opposite sides respectively slidably coupled to the sliding grooves of the track frame, wherein two sliding wings are respectively fastened to the two outward flanges of the sliding frame and moved with the sliding frame in the sliding grooves of the track frame, each of the sliding wing having a longitudinal mounting groove at an inner side, which receives one outward flange of the sliding frame, an outward flange at an outer side, two horizontal springy ribs longitudinally disposed at two opposite sides of the outward flange of the respective sliding wing and defining a respective longitudinal slot, and two arched projections respectively and outwardly raised from the horizontal springy ribs and stopped at a vertical side wall of one sliding groove of the track frame.

6 Claims, 2 Drawing Sheets

SLIDING TRACK ASSEMBLY

BACKGROUND OF THE INVENTION

The present invention relates to sliding track assemblies, and more particularly to such a sliding track assembly which comprises two springy sliding wings coupled to two opposite outward flanges of a sliding frame to guide it sliding in sliding grooves of a track frame stably.

A variety of sliding track assemblies have been intensively used in furniture. A sliding track assembly for this purpose is generally comprised of a track frame fixedly secured to a fixed member for example a table, and a sliding frame fixedly secured to a movable member for example a drawer and sliding in the track frame. Through the sliding track assembly, the movable member (the drawer) can be moved in and out of the fixed member (the table). The track frames and sliding frames of conventional sliding track assemblies are commonly made from metal. When the sliding frame of a sliding track assembly is coupled to the track frame thereof, the side to side contact between the track frame and the sliding frame causes a high friction force during the movement of the sliding frame relative to the track frame, therefore the sliding frame cannot be smoothly moved in and out of the track frame. If the sliding frame and the track frame are not precisely processed into shape, the sliding frame may vibrate when moved in the track frame.

SUMMARY OF THE INVENTION

The present invention has been accomplished to provide a sliding track assembly which eliminates the aforesaid drawbacks. According to one aspect of the present invention, the sliding track assembly including a track frame fixedly secured to a fixed member and defining two substantially C-shaped sliding grooves longitudinally disposed at two opposite sides and facing each other, and a sliding frame fixedly secured to a movable member and having two outward flanges at two opposite sides respectively slidably coupled to the sliding grooves of the track frame, wherein two sliding wings are respectively fastened to the two outward flanges of the sliding frame and moved with the sliding frame in the sliding grooves of the track frame, each of the sliding wing having a longitudinal mounting groove at an inner side, which receives one outward flange of the sliding frame, an outward flange at an outer side, two horizontal springy ribs longitudinally disposed at two opposite sides of the outward flange of the respective sliding wing and defining a respective longitudinal slot, two arched projections respectively and outwardly raised from the horizontal springy ribs and stopped at a vertical side wall of one sliding groove of the track frame, and at least two vertical springy ribs respectively raised from the top and bottom sides along the length and disposed in contact with the horizontal top and bottom walls of one sliding groove of the track frame to guide the movement of the sliding frame in the sliding grooves of the track frame. According to another aspect of the present invention, the sliding wings are respectively molded from high polymer plastic.

DETAILED DESCRIPTION OF THE PREFERRED EMBODIMENT

Figure 1:
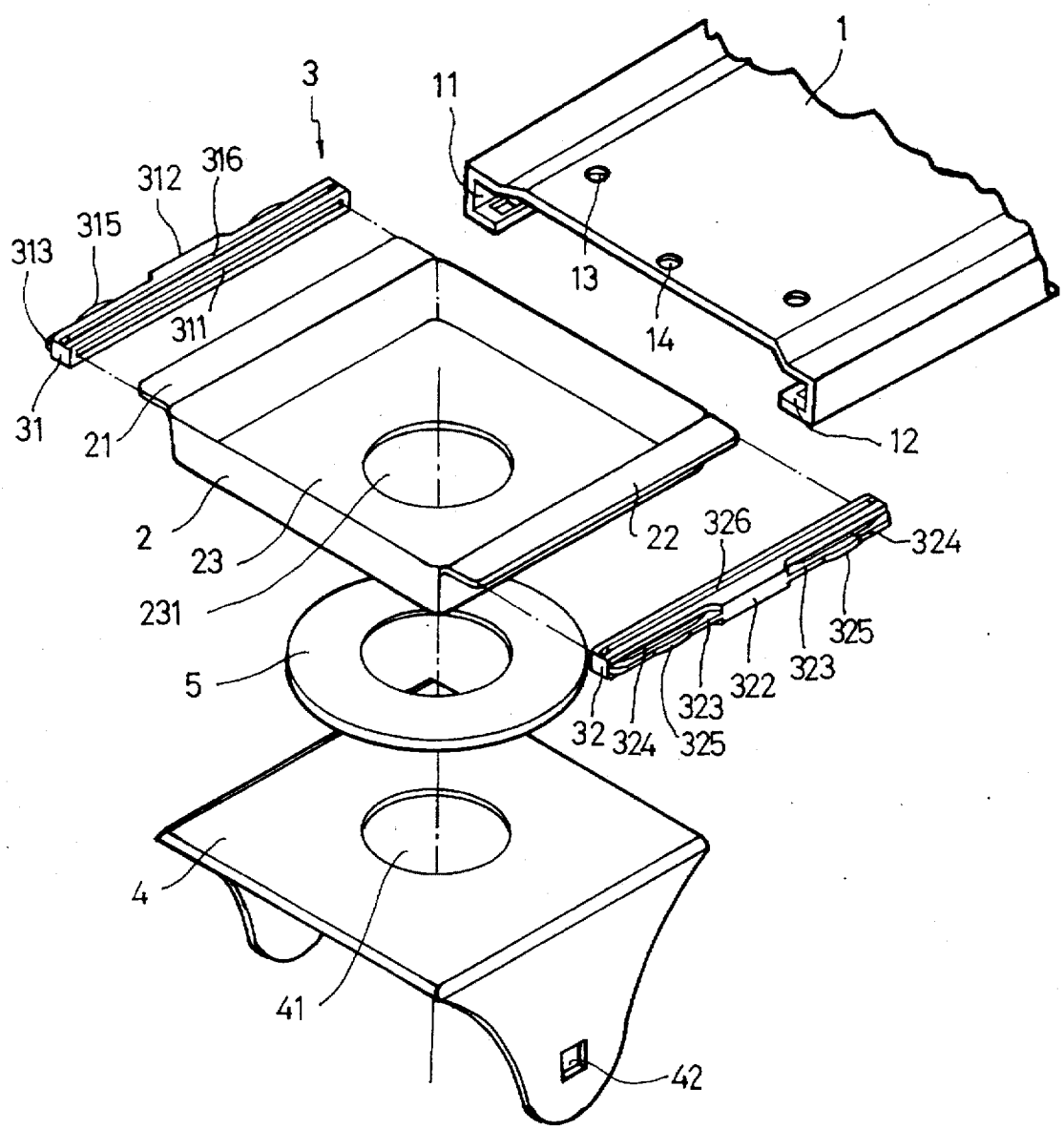
FIG. 1 is an exploded view of a sliding track assembly according to the present invention.
Figure 2:
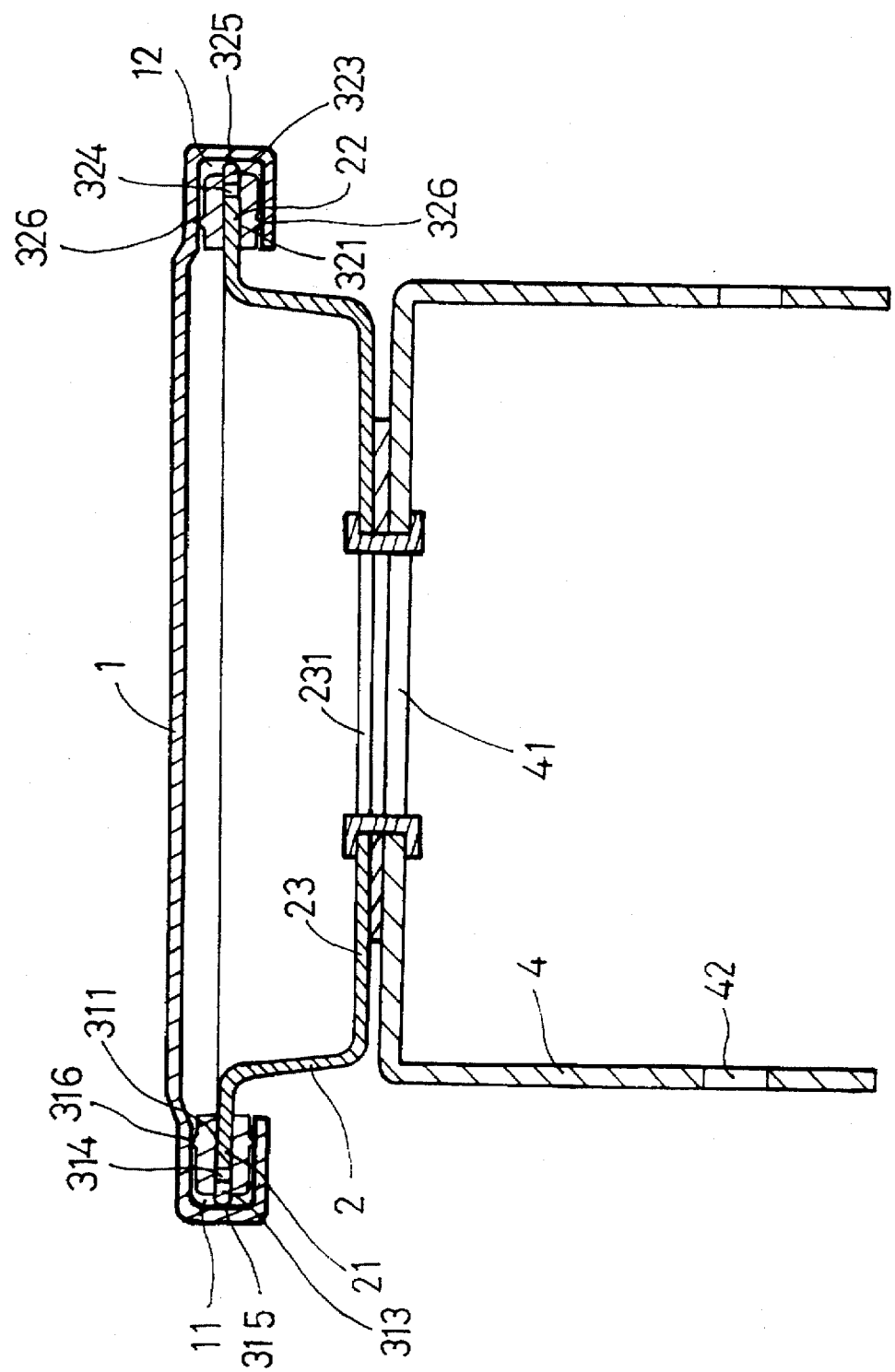
FIG. 2 is a sectional assembly view of the sliding track assembly shown in FIG. 1.

Referring to FIGS. 1 and 2, a sliding track assembly in accordance with the present invention is generally comprised of a track frame 1, a sliding frame 2, and a sliding wing unit 3.

The track frame 1 is made from a metal sheet by bending, defining a first substantially C-shaped sliding groove 11 and a second substantially C-shaped sliding groove 12 longitudinally and bilaterally disposed at the bottom, a plurality of mounting holes 13 adapted for fastening to a bottom side of for example a table top by screws, and two locating holes 14 respectively disposed near the front and rear ends and adapted for holding a respective stop means for limiting the forward and backward moving distance of the sliding frame 2.

The sliding frame 2 is made from a metal sheet by bending and stamping and shaped like a rectangular frame fitting the space defined within the track frame 1 between the sliding grooves 11, 12, having a first outward flange 21 and a second outward flange 22 bilaterally raised from two opposite lateral sides thereof at the top and adapted for sliding in the sliding grooves 11, 12 of the track frame 1 respectively.

The sliding wing unit 3 is comprised of a first sliding wing 31 and a second sliding wing 32. The sliding wing 31 or 32 comprises a longitudinal mounting groove 311 or 321 at an inner side, which receives one outward flange 21 or 22 of the sliding frame 2, an outward flange 312 or 322 at an outer side, two horizontal springy ribs 313 or 323 longitudinally disposed at two opposite sides of the outward flange 312 or 322 and respectively extended to the front and rear ends and defining a respective longitudinal slot 314 or 324, two arched projections 315 or 325 respectively and outwardly raised from the horizontal springy ribs 313 or 323 and adapted for stopping at the vertical side wall of one sliding groove 11 or 12 of the track frame 1, and two vertical springy ribs 316 or 326 perpendicularly raised from the top and bottom sides along the length and adapted for stopping at the horizontal top and bottom walls of one sliding groove 11 or 12 of the track frame 1. Because the sliding wings 31, 32 are respectively disposed in contact with the surface of the track frame 1 through the arched projections 315, 325 and the arched projections 315, 325 are respectively raised from the horizontal springy ribs 313 or 323, less friction resistance is produced between the sliding wing unit 3 and the track frame 1 when the sliding frame 2 is moved in the track frame 1. Because the vertical springy ribs 316 or 326 are respectively disposed in contact with the horizontal top and bottom walls of one sliding groove 11 or 12 of the track frame 1, the sliding wing unit 3 and the sliding frame 2 can be moved in the sliding grooves 11, 12 of the track frame 1 stably.

Referring to FIGS. 1 and 2 again, the sliding frame 2 comprises a bottom wall 23, and a bottom hole 231 at the center of the bottom wall 23. A swivel frame 4 is provided, having a vertical coupling hole 41 coupled to the bottom hole 231 of the bottom wall 23 of the sliding frame 2 by a pivot (not shown), and two horizontal mounting holes 42 at opposite lateral sides for fastening to a movable member for example a keyboard rack. When installed, the swivel frame 4 can be turned about the pivot through 360° angle. Further, a cushion 5 is mounted around the pivot and disposed between the swivel frame 4 and the sliding frame 2 to eliminate the occurrence of noises during the rotary motion of the swivel frame 4 relative to the sliding frame 2.

The sliding wings 31, 32 are respectively molded from wear resistant rubber. Therefore, when the sliding wings 31, 32 are respectively fastened to the outward flanges 21, 22 of the sliding frame 2 and inserted into the sliding grooves 11, 12 of the track frame 1, the arched projections 315, 325 of the sliding wings 31, 32 are constantly maintained in contact with the vertical side walls of the sliding grooves 11, 12 by point contact, enabling the sliding frame 2 to be stably moved in and out of the track frame 1. Because the sliding wings 31, 32 are respectively disposed in contact with the top and bottom side walls of the sliding grooves 11, 12 of the track frame 1 through the vertical springy ribs 316, 326 by line contact, the contact area between the sliding wing unit 3 and the track frame 1 is minimized.

While only one embodiment of the present invention has been shown and described, it will be understood that various modifications and changes could be made thereunto without departing from the spirit and scope of the invention disclosed.

What the invention claimed is:

1. A sliding track assembly comprising a track frame fixedly secured to a fixed member and defining two substantially C-shaped sliding grooves longitudinally disposed at two opposite sides and facing each other, and a sliding frame fixedly secured to a movable member and moved in and out of said track frame, said sliding frame having two outward flanges raised from two opposite lateral sides and respectively coupled to the sliding grooves of said track frame, wherein two sliding wings are respectively fastened to the two outward flanges of said sliding frame and moved with said sliding frame in the sliding grooves of said track frame, each of said sliding wing comprising a longitudinal mounting groove at an inner side, which receives one outward flange of said sliding frame, an outward flange at an outer side, two horizontal springy ribs longitudinally disposed at two opposite sides of the outward flange of the respective sliding wing and defining a respective longitudinal slot, and two arched projections respectively and outwardly raised from said horizontal springy ribs and stopped at a vertical side wall of one sliding groove of said track frame.

2. The sliding track assembly of claim 1 wherein each of said sliding wings further comprises at least one vertical top springy rib and at least one vertical bottom springy rib perpendicularly raised from top and bottom sides thereof along the length and respectively disposed in contact with horizontal top and bottom side of said track frame.

3. The sliding track assembly of claim 1 wherein said sliding frame comprises a bottom hole at the center of a bottom wall thereof, and a swivel frame coupled to said bottom hole by pivot means, said swivel frame having two horizontal mounting holes at two opposite sides adapted for fastening to a movable member.

4. The sliding track assembly of claim 3 wherein said sliding frame further comprises a cushion mounted around said pivot means between the bottom wall thereof and said swivel frame.

5. The sliding track assembly of claim 4 wherein said cushion is molded from high polymer plastic.

6. The sliding track assembly of claim 1 wherein said sliding wings are respectively molded from high polymer plastic.

\* \* \* \* \*